United States Patent
Lin et al.

(10) Patent No.: US 11,915,158 B2
(45) Date of Patent: *Feb. 27, 2024

(54) CROSS-DOMAIN ACTION PREDICTION

(71) Applicant: Yahoo Assets LLC, Dulles, VA (US)

(72) Inventors: Su-Chen Lin, Taipei (TW); Zhungxun Liao, New Taipei (TW); Jian-Chih Ou, New Taipei (TW); Tzu-Chiang Liou, New Taipei (TW)

(73) Assignee: Yahoo Assets LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,415

(22) Filed: Jan. 16, 2023

(65) Prior Publication Data
US 2023/0153660 A1    May 18, 2023

Related U.S. Application Data

(63) Continuation of application No. 16/884,151, filed on May 27, 2020, now Pat. No. 11,556,822.

(51) Int. Cl.
| | |
|---|---|
| *H04L 67/50* | (2022.01) |
| *G06N 3/10* | (2006.01) |
| *G06N 5/02* | (2023.01) |
| *G06N 5/046* | (2023.01) |
| *G06N 3/047* | (2023.01) |
| *G06N 7/01* | (2023.01) |

(52) U.S. Cl.
CPC ........... *G06N 5/046* (2013.01); *G06N 3/10* (2013.01); *G06N 5/02* (2013.01); *H04L 67/535* (2022.05); *G06N 3/047* (2023.01); *G06N 7/01* (2023.01)

(58) Field of Classification Search
CPC ........... G06N 5/046; G06N 3/10; G06N 5/02; G06N 3/047; G06N 7/01; G06N 3/044; G06N 3/045; G06N 3/08; G06N 5/01; G06N 20/00; H04L 67/535; H04L 67/1097
See application file for complete search history.

(56) References Cited

U.S. PATENT DOCUMENTS

| | | | | |
|---|---|---|---|---|
| 8,095,523 | B2 * | 1/2012 | Brave ................. | G06F 16/9535 |
| | | | | 707/705 |
| 8,332,334 | B2 * | 12/2012 | Long ..................... | G06N 20/00 |
| | | | | 706/42 |
| 9,275,342 | B2 * | 3/2016 | Vijayaraghavan ....... | G06N 5/04 |
| 10,277,715 | B1 * | 4/2019 | Yan ..................... | G06Q 30/0201 |
| 2016/0253597 | A1 * | 9/2016 | Bhatt ..................... | G06N 20/00 |
| | | | | 706/12 |
| 2016/0364382 | A1 * | 12/2016 | Sarikaya ................. | G06F 40/40 |

* cited by examiner

*Primary Examiner* — Abdullahi E Salad
(74) *Attorney, Agent, or Firm* — Cooper Legal Group LLC

(57) ABSTRACT

One or more computing devices, systems, and/or methods for cross-domain action prediction are provided. Action sequence embeddings are generated based upon a textual embedding and a graph embedding utilizing past user action sequences corresponding to sequences of past actions performed by users across a plurality of domains. An autoencoder is trained to utilize the action sequence embeddings to project the action sequence embeddings to obtain intent space vectors. A service switch classifier is trained using the intent space vectors. In response to the service switch classifier predicting that a current user will switch from a current domain to a next domain, the current user is provided with a recommendation of an action corresponding to the next domain.

20 Claims, 8 Drawing Sheets

CROSS-DOMAIN ACTION PREDICTION

RELATED APPLICATION

This application claims priority to and is a continuation of U.S. application Ser. No. 16/884,151, filed on May 27, 2020, entitled "CROSS-DOMAIN ACTION PREDICTION", which is incorporated by reference herein in its entirety.

BACKGROUND

Many users may perform tasks across a variety of services, applications, platforms, and/or websites corresponding to different types of domains, such as a news application having a news domain, a shopping website having a shopping domain, a social network service having a social networking domain, etc. For example, a user may utilize a user device to access the news application having the news domain. The user may read various articles pertaining to topics that may be interesting to the user, such as an article about a basketball playoff game. Based upon actions performed by the user while in the news domain (e.g., reading articles about basketball), the user may decide to transition to a different domain, such as the shopping website having the shopping domain. While accessing the shopping website, the user may perform an action such as purchasing a basketball jersey because the user recently read the basketball articles while in the news domain.

SUMMARY

In accordance with the present disclosure, one or more computing devices and/or methods for cross-domain action prediction are provided. A service switch classifier is trained to predict whether users will switch between domains (e.g., switching from reading movie reviews within a news domain to purchasing a movie from a movie streaming service having a streaming domain), and to recommend actions to users that relate to the domains to which the users are predicted to switch (e.g., a recommendation to sign up for a movie club newsletter). A domain may correspond to an application, a service, a website, a platform, or other provider or content, which may correspond to a certain domain topics, such as a news domain, a shopping domain, a social network domain, a sports domain, a job search domain, an entertainment domain, a gaming domain, and/or a variety of other domain topics.

While users are performing actions in one domain (e.g., reading a movie review from a movie review service), the users may switch to another domain (e.g., purchasing a movie through a streaming service) due to information learned in the prior domain. This information may be collected as past user action sequences. The past user action sequences may be utilized as heterogeneous inputs from different domains and services, which can be integrated into a comprehensive understanding of user behavior. The past user action sequences are series of actions defined as action chains, in which users switch between different domains/services given intent transitions due to information collected in prior domains/services (e.g., while reading movie reviews, the user forms an interest in a particular movie to purchase).

The past user action sequences, corresponding to past user actions performed by users across a plurality of domains (e.g., a user reading a movie review, then visiting a social network group for discussing movies, and then finally renting a movie from a movie streaming service), are used to train a graph embedding. For example, a graph may be constructed from the past user action sequences. A Deep-Walk technique may be applied to the graph to extent the past user action sequences. In this way, relationships between different actions (e.g., reading a movie review and then purchasing a movie) may be learned as relational knowledge.

Action sequence embeddings are generated based upon the graph embedding (e.g., the relational knowledge of relationships between different actions) and a textual embedding applied to the past user action sequences. In an example of the textual embedding, textual content such as descriptive information associated with past user actions (e.g., text of a content item interacted with by a user such as text of a movie review, a categorical topic of the content item, publisher details, etc.) is taken into account to define textual content of actions for inclusion within the action sequence embeddings.

An autoencoder is trained using the action sequence embeddings to project the action sequence embeddings to obtain intent space vectors. Each action sequence embedding is projected into its own intent space vector to represent intent of the user (e.g., intent to transition to a particular domain/service, intent to perform a particular action within a particular domain/service, etc.) while performing actions within a particular action sequence embedding. A service switch classifier is trained using the intent space vectors to predict a domain that a user intends to use and actions that the use would likely perform in that domain.

For a current user of a current domain (e.g., a user currently reading about the housing market on a financial advice website), the service switch classifier is used to predict whether the current user will switch from the current domain (e.g., a financial domain) to a particular next domain. A current user action sequence for the user is determined. The current user action sequence may correspond to actions that the user has recently performed, such as reading various housing market articles, viewing mortgage interest rates, etc.). The action sequence embeddings are applied to the current user action sequence to generate a current action sequence embedding. The current action sequence embedding is used to predict whether the current user will switch from the current domain (e.g., the financial domain) to a next domain (e.g., a real estate domain). The current action sequence embedding is projected into a current intent space vector for the current user. The current intent space vector is used as input into a plurality of classifiers that will each output predictions as to whether the current user will switch domains from the current domain to the next domain. A voter mechanism is used to combine the outputs from the classifiers to determine a final prediction corresponding to a probability of the user switching from the current domain to the next domain. If the probability exceeds a threshold, then the service switch classifier is used to identify one or more actions to recommend to the current user. The one or more actions may correspond to the next domain (e.g., a link to a real estate website, a recommendation of a realtor, a description of a house for sale, etc.). The one or more actions may be presented to the current user, such as displayed through a user interface used by the current user to access the current domain.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
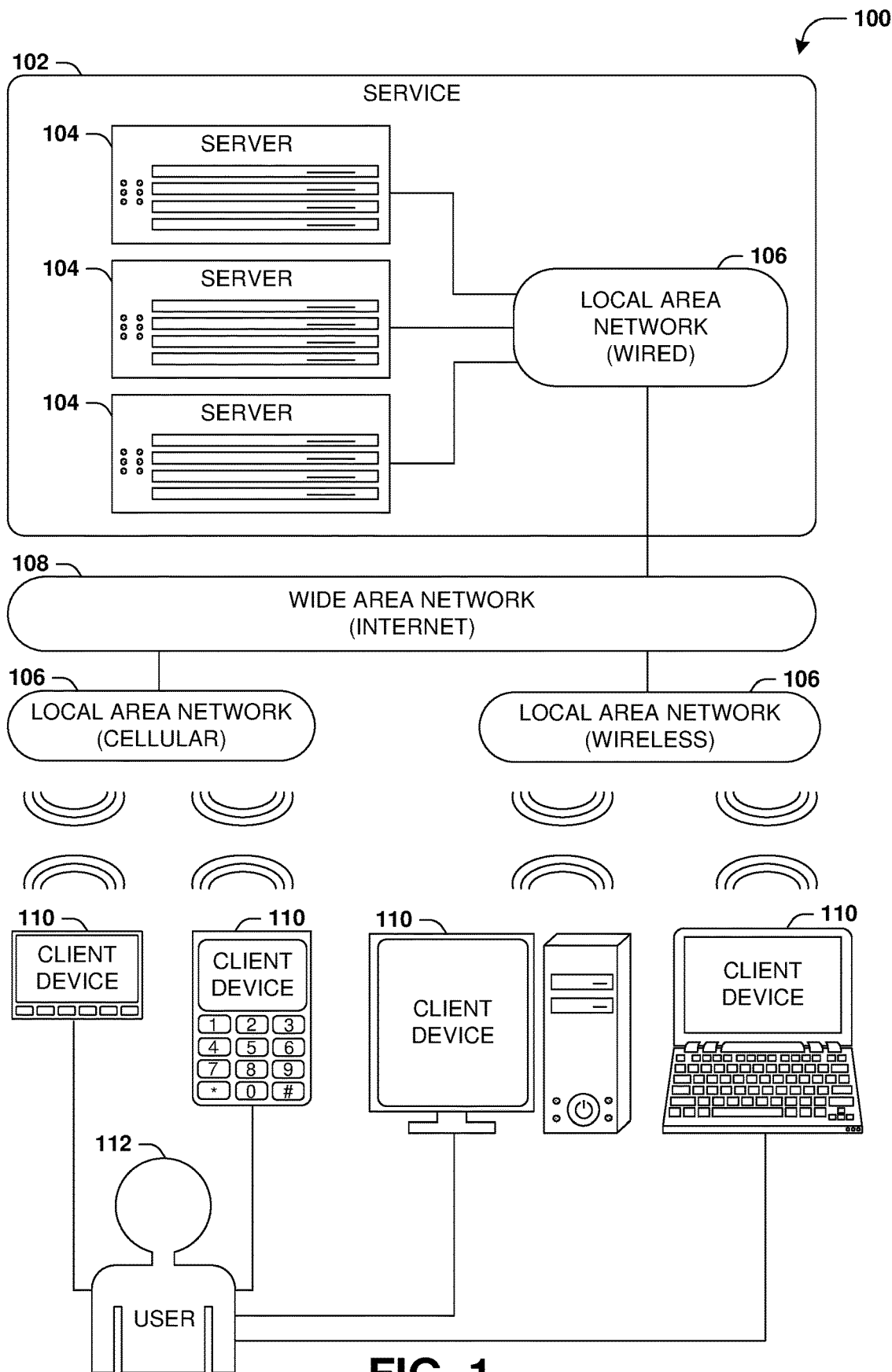
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
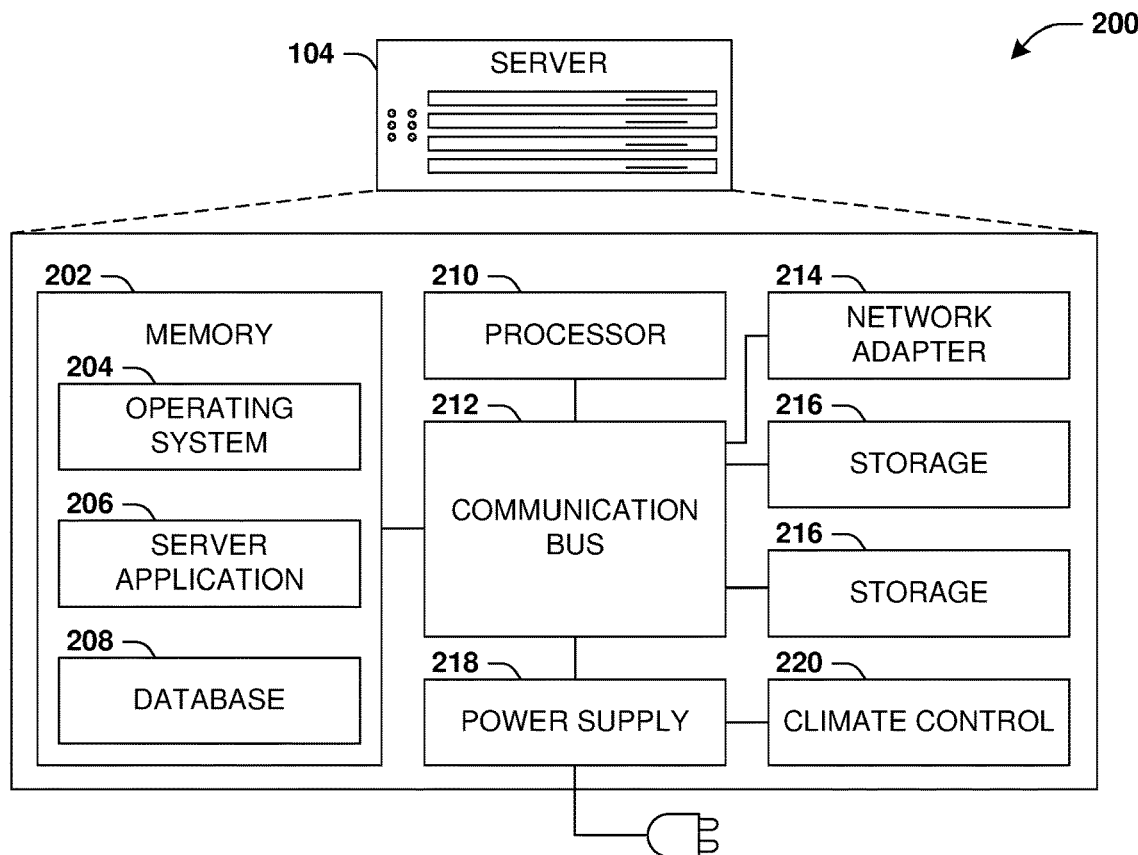
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
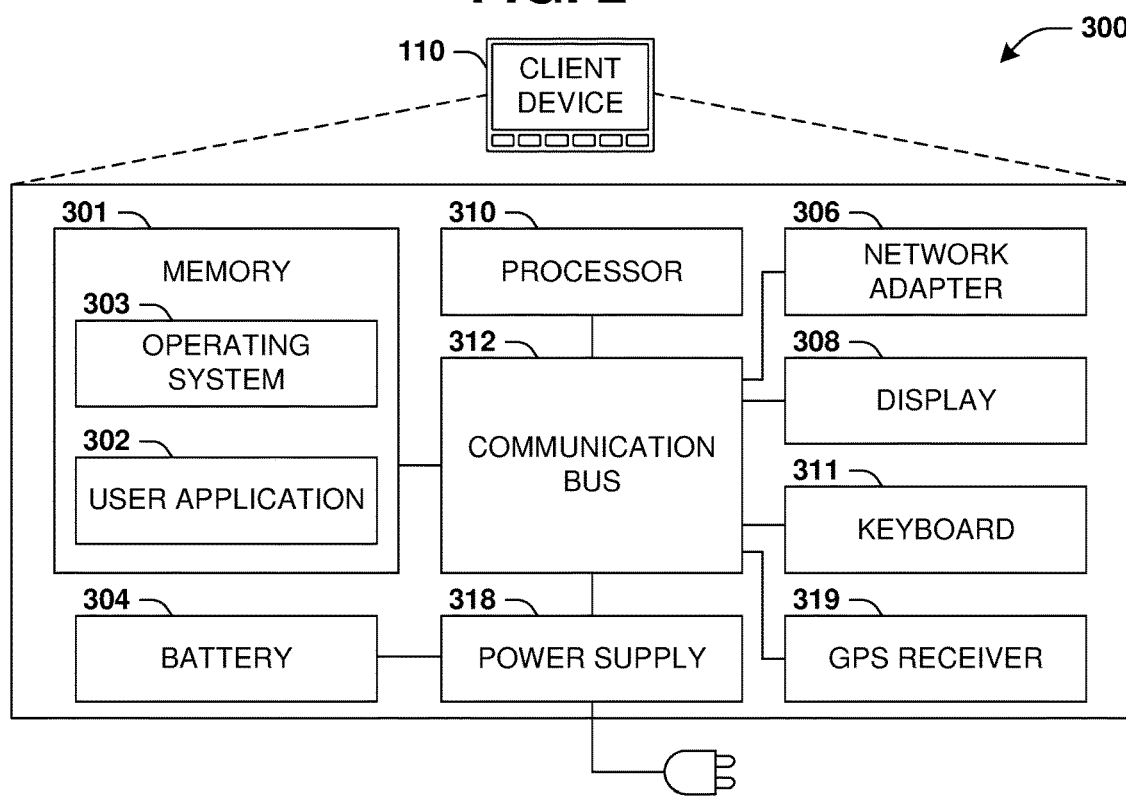
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for cross-domain action prediction are provided. Users may perform tasks by performing actions across multiple domains, such across various services, applications, platforms, and/or websites having different domain types. A domain may correspond to a particular type of service, application, platform, website, etc., such as a news domain, a sports domain, an entertainment domain, a finance domain, a social network domain, an application store domain, a streaming service domain, a real estate domain, etc. Users may typically search for information using different types (domains) of websites as opposed to a single type (domain) of website. For example, a user may read book reviews through a social network book club page having a social network domain, then read about upcoming book releases through an entertainment section of a news website having a news domain, and may finally purchase a book through a shopping application having a shopping domain. As the user performs actions across the various domains (e.g., reading content items such as articles, clicking links, viewing images, signing up for newsletters, watching a video, submitting search queries, etc.), the user may learn more information that leads the user to transition to other domains.

Merely taking into account actions by a user within a single domain (e.g., only actions taken by the user while interacting with the social network book club page as opposed to also the news website) when determining user behavior and intent will lead to imprecise predictions of what a current user may intend to do next. This will lead to recommendations of actions and content items that may be irrelevant to the current user because a wrong or imprecise user intent was predicted. This wastes computing resources, network bandwidth, and may frustrate or annoy the user with being provided with irrelevant content and recommendations.

Accordingly, as provided herein, user actions across multiple domains may be taken into account when predicting user intent. A service switch classifier is trained using action sequence embeddings derived from graph embeddings and textual embeddings that are applied to past user action sequences corresponding to sequences of past actions performed by users across a plurality of domains. The switch classifier may also be trained using additional information, such as timespan between two different consecutive actions being performed, a time at which an action is executed, a length of content upon which an action is executed (e.g., a number of characters within an article read by a user), a type of current action (e.g., reading an article, viewing an image, watching a video, creating a social network post, clicking a link, submitting information, searching content of a video streaming service, purchasing an item or service, reading an email, etc.).

The service switch classifier is trained to predict a probability that a user will switch from a current domain to a particular next domain (e.g., the user switching from reading articles regarding outdoor patio ideas in a gardening domain to looking for landscapers through a contractor website within a contractor service domain). If the probability exceeds a threshold that the user will switch from the current domain to the next domain, then the service switch classifier is used to identify actions to recommend to the user. The actions may be related to the next domain (e.g., a recommendation of a landscaper may be provided to the user while the user is still within the gardening domain). In this way, more precise and relevant recommendations may be generating and displayed to users.

Figure 4:
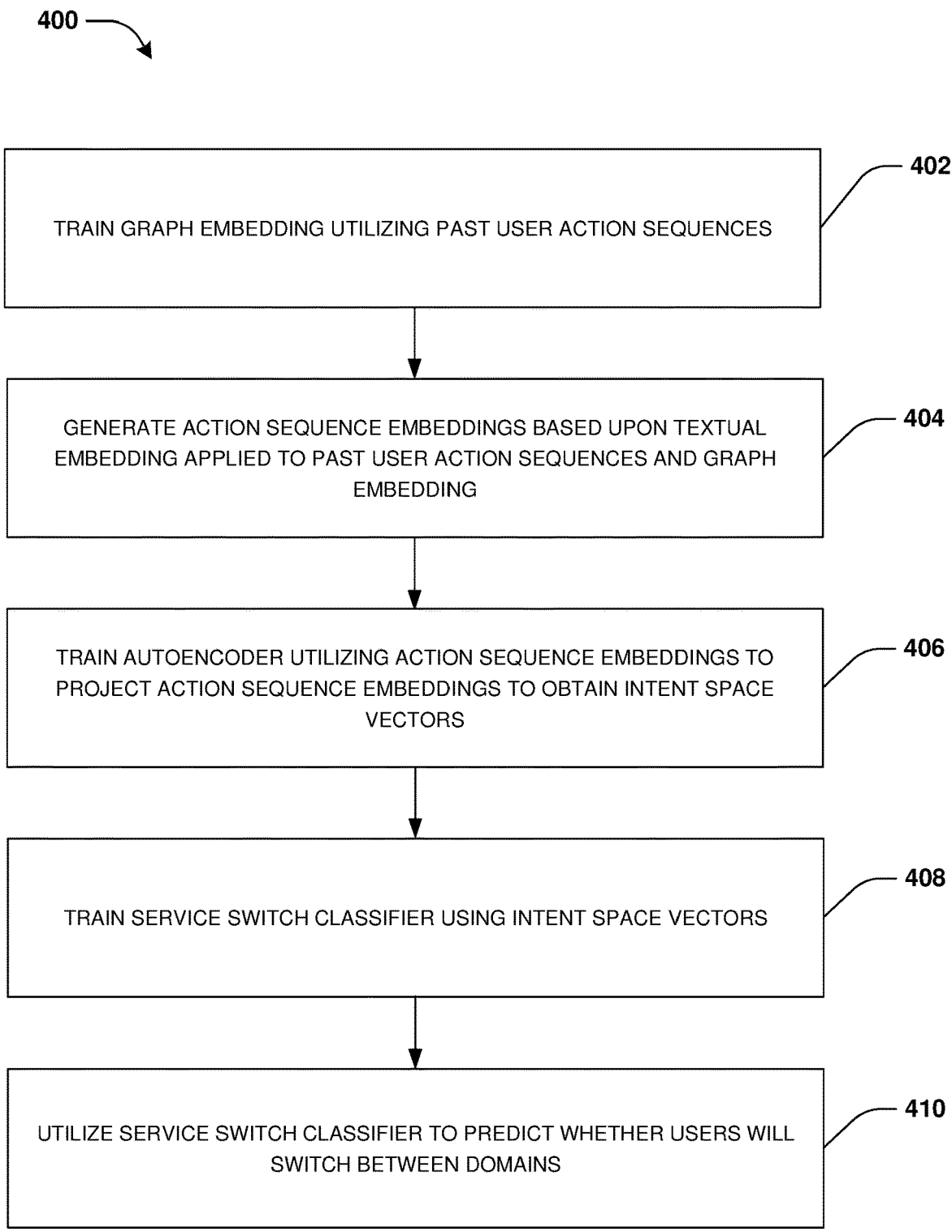
FIG. 4 is a flow chart illustrating an example method for cross-domain action prediction.
Figure 5:
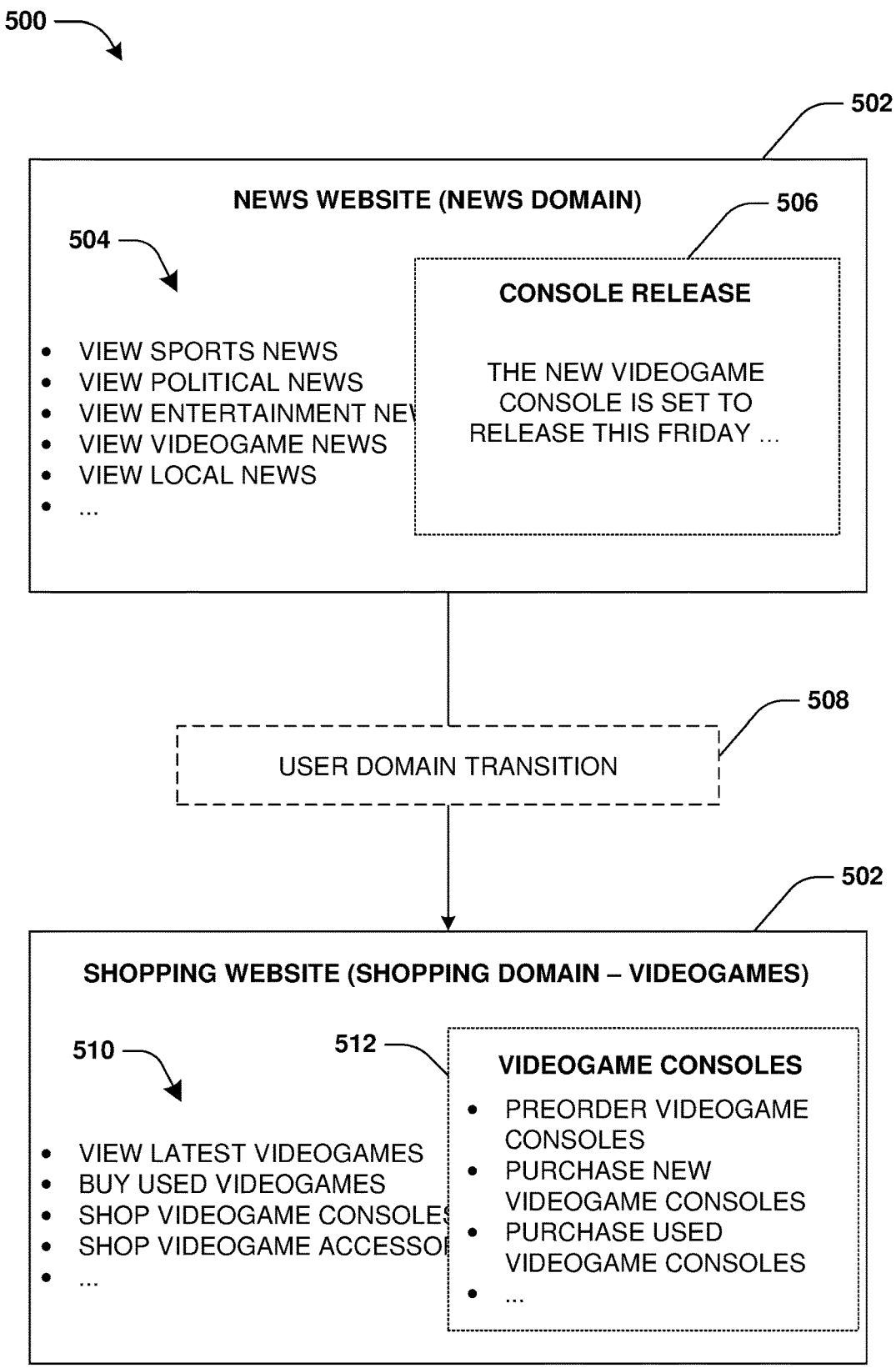
FIG. 5 is an illustration of an example of a user domain transition.

An embodiment of cross-domain action prediction is illustrated by an example method 400 of FIG. 4. A service switch classifier (e.g., a service switch classifier 701 of FIG. 7) may be trained using past user action sequences corresponding to sequences of past actions performed by users across a plurality of domains. The past user action sequences may be tracked as users perform actions through various websites, platforms, services, applications, etc. In an example of tracking past user action sequences, FIG. 5 illustrates an example 500 of a past user action sequence that comprises actions performed across multiple domains. For example, a user may utilize a computing device 502 (e.g., a mobile device, a laptop, a computer, a tablet, etc.) to access a news website 504 having a news domain classification. The user may perform various actions while accessing the news website 504, such as clicking links, watching videos, submitting information, reading articles, etc. For example, the user may read a news story 506 regarding a new videogame console that is going to release on Friday. These actions may be tracked as past user actions that may be grouped into past user action sequences (e.g., if two consecutive actions occur within a threshold timespan of one another such as within 30 minutes or any other timespan, then the two consecutive actions may be considered part of a same past user action sequence).

After reading the news story 506 regarding the new videogame console release, the user may form a user intent to preorder the new videogame console. Accordingly, the user may perform a user domain transition 508 to transition from the news website 504 having the news domain classification to a shopping website 510 having a shopping domain classification (e.g., a videogame shopping domain classification). The user may perform various actions while accessing the shopping website 510, such a viewing videogame reviews, submitting search queries, adding items into a shopping cart, making purchases, etc. For example, the user may utilize a videogame consoles purchase user interface 512 of the shopping website 510 to preorder the new videogame console. These actions may be tracked, along with the actions performed by the user while at the news website 504 of the news domain, as past user actions that may be grouped into past user action sequences (e.g., if two consecutive actions occur within a threshold timespan of one another such as within 30 minutes or any other timespan, then the two consecutive actions may be considered part of a same past user action sequence). For example, a user action sequence may include the user reading the news story 506 while at the news website 504 having the news domain and preordering the new videogame console while at the shopping website 510 having the shopping domain. In this way, a user action sequence may include actions performed across multiple domains as opposed to a single domain.

Figure 6:
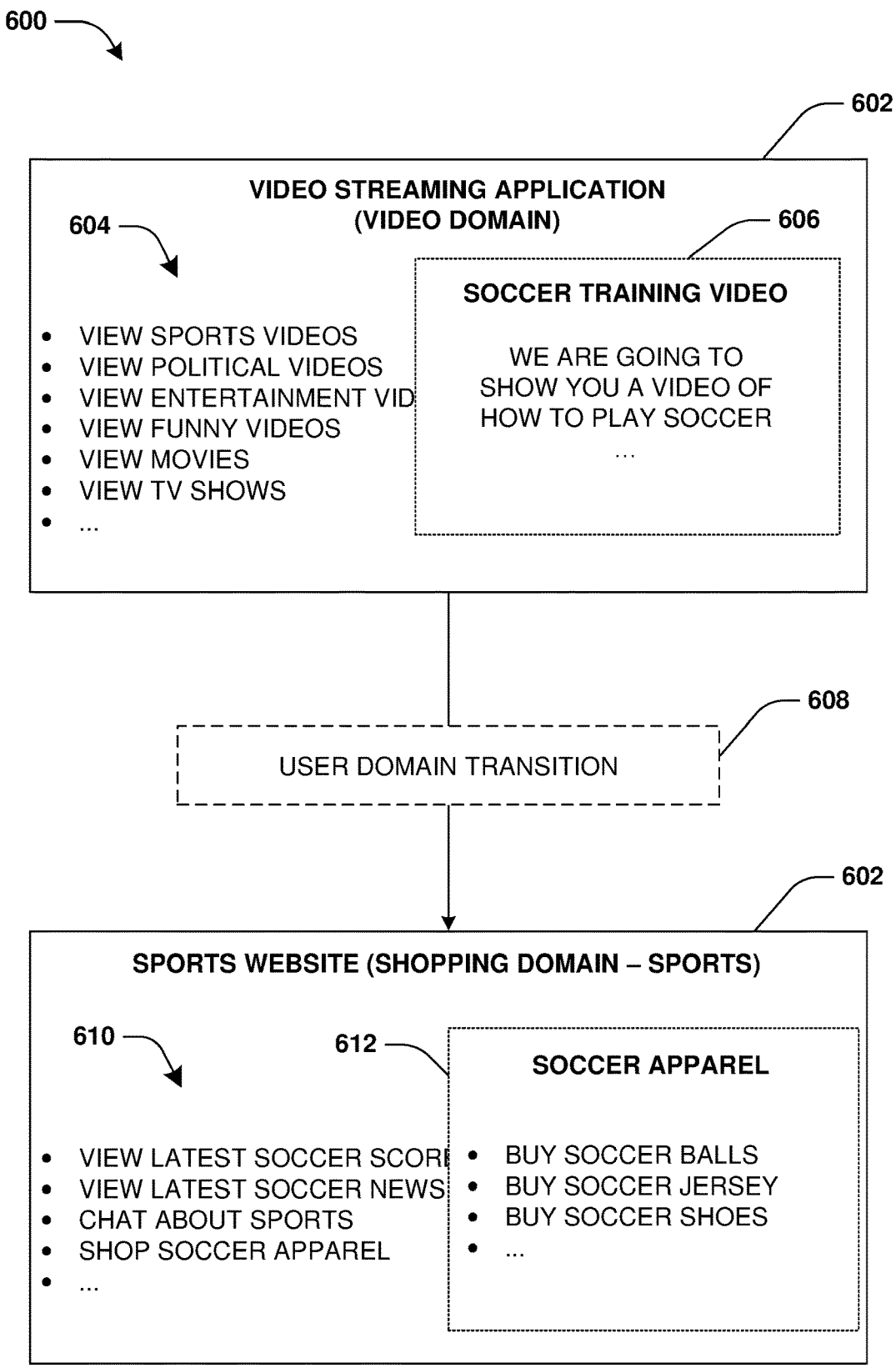
FIG. 6 is an illustration of an example of a user domain transition.

In another example of tracking past user action sequences, FIG. 6 illustrates an example 600 of a past user action sequence that comprises actions performed across multiple domains. For example, a user may utilize a computing device 602 (e.g., a mobile device, a laptop, a computer, a tablet, etc.) to access a video streaming application 604 having a video domain classification. The user may perform various actions while accessing the video streaming application 604, such as renting movies, submitting search queries, reading movie reviews, submitting user reviews, rating movies, etc. For example, the user may watch a soccer training video 606. These actions may be tracked as past user actions that may be grouped into past user action sequences (e.g., if two consecutive actions occur within a threshold timespan of one another such as within 20 minutes or any other timespan, then the two consecutive actions may be considered part of a same past user action sequence).

After watching the soccer training video 606, the user may form a user intent to buy a soccer ball. Accordingly, the user may perform a user domain transition 608 to transition from the video streaming application 604 having the video domain classification to a sports website 610 having a shopping domain classification (e.g., a sports shopping domain classification). The user may perform various actions while accessing the sports website 610, such a chatting about sports, viewing soccer news, viewing sports scores, shopping for sports apparel, etc. For example, the user may utilize a soccer apparel shopping user interface 612 of the sports website 610 to purchase the soccer ball. These actions may be tracked, along with the actions performed by the user while using the video streaming application 604 of the video domain, as past user actions that may be grouped into past user action sequences (e.g., if two consecutive actions occur within a threshold timespan of one another such as within 20 minutes or any other timespan, then the two consecutive actions may be considered part of a same past user action sequence). For example, a user action sequence may include the user watching the soccer training video 606 while using the video streaming application 604 having the video domain and purchasing the soccer ball while at the sports website 610 having the shopping domain. In this way, a user action sequence may include actions performed across multiple domains as opposed to a single domain.

At 402 of method 400, the past user action sequences are used to train a graph embedding to obtain relational knowledge corresponding to relationships between actions performed by users (e.g., a relationship between a user viewing a sports video and purchasing a soccer ball, a relationship between a user reading movie reviews and posting a social network post about movie suggestions, etc.). The graph embedding may be used to extend the past user action sequences with the relational knowledge and relationships between actions. In an embodiment, a past user action sequence may be represented as a path within a network, such as a directed graph. Each action is a node within the directed graph, and edges between nodes represent action-to-action links. The directed graph is processed, such as walked using a DeepWalk algorithm, to learn low-dimensional representations of each node (each action) by simulating multiple random walks within the directed graph in order to generate relational representations for each node (each action) within the directed graph. Node sequences (user action sequences) may be generated based upon the random walks. A representation for a node may comprise a matrix mapping trainable parameters and a hidden dimension. A skip-gram algorithm may also be applied. In this way, the graph embedding is trained/generated based upon the past user action sequences.

At 404, action sequence embeddings are generated based upon the graph embedding and based upon a textual embedding applied to the past user action sequences. In an example, a bidirectional encoder representation transformer (BERT) or other natural language processing functionality (e.g., an encoder-decoder model that utilizing masking techniques) may be used for the textual embedding. For example, an encoder structure may be built by defining textual content of actions (e.g., text of an article read by a user), which is transformed using word segmentation to create word representations. A key-value memory network is applied to the word representations, which are split into vectors (e.g., 3 vectors) corresponding to linear mappings. A decoder may be defined in a similar manner. The encoder and decoder (e.g., a 7 layer fully connected autoencoder) may be used to embed textual knowledge for the past user action sequences. In this way, action sequence embeddings are generated based upon the graph embedding and the textual embedding.

At 406, an autoencoder may be trained utilizing the action sequence embeddings to project the action sequence embeddings to obtain intent space vectors. Each action sequence embedding is projected to obtain a corresponding intent space vector (e.g., a first intent space vector corresponds to a projection of a first action sequence embedding; a second intent space vector corresponds to a projection of a second action sequence embedding; etc.). In this way, the autoencoder (e.g., a long short-term memory (LSTM) autoencoder) transfers the past user actions within the action sequence embeddings into intent space vectors corresponding to user intents (e.g., actions corresponding to an intent of a user to switch to a particular domain and/or to perform a particular action).

The autoencoder may be trained based upon various additional information. In an example, the autoencoder may be trained based upon time spent metrics. A time spent metric corresponds to a time difference between two consecutive actions within the past user action sequences (e.g., a time between a user reading an article and the user subsequently submitting a search query). In an example, the autoencoder may be trained based upon times at which actions within the past user action sequences were performed. In an example, the autoencoder may be trained based upon content sizes of content items (e.g., a number of characters, words, etc. within an article read by a user) upon which actions within the past user action sequences were performed. In an example, the autoencoder may be trained based upon content types of content items upon which actions within the past user action sequences were performed (e.g., text, an article, a search query, a video, an image, a social network post, etc.).

At 408, the service switch classifier is trained using the intent space vectors. The service switch classifier is trained to identify patterns in user behavior (user actions) that correspond to switching from one domain to another domain. For example, the intent space vectors may indicate that a user has an intent to switch to a videogame shopping domain and/or to perform a videogame console preorder action within the videogame shopping domain after reading videogame console release articles within a news domain. The service switch classifier can be trained to identify this intent to switch to the videogame shopping domain and/or to perform the videogame console preorder action by learning such patterns from the intent space vectors.

At 410, the service switch classifier is utilized to predict whether users will switch between domains and/or to recommend actions (e.g., viewing a content item, signing up for a newsletter, viewing an image, watching a video, buying a product, downloading an application, listening to a song, subscribing to a service, etc.) associated with the domains to which the user are predicted to switch. In an example, a current user may be interacting with one or more services, platforms, websites, applications, etc. For example, the current user may be currently reading an article about coffee makers through a news mobile application executing on a user device. A current action sequence of the current user reading the article may be identified. The current action sequence of the current user may also comprise other actions while the user is interacting with the news mobile application executing on the user device. The current action sequence of the current user may also comprise other actions that the user performed while using other applications, websites, service, and/or platforms that may have the same or different domain as the news mobile application. In this way, user actions (e.g., consecutive user actions that are performed within a threshold timespan of one another such as 20 minutes or any other timespan) may be identified and tracked as the current action sequence of the current user by the service switch classifier.

The service switch classifier may apply the action sequence embeddings to the current user action sequence of the current user to generate a current action sequence embedding. The current action sequence embedding may be used by the service switch classifier to predict whether the current user will switch from a current domain (e.g., the news mobile application executing on the user device) to a next domain (e.g., a home appliance shopping website). In particular, the current action sequence embedding may be projected by the service switch classifier to obtain a current intent space vector for the current user. The current intent space vector may be evaluated by the service switch classifier to generate a prediction as to whether the current user will switch from the current domain to the next domain. For example, the current intent space vector of the current user may be utilized as input into a plurality of classifiers by the service switch classifier for generating the prediction of whether the current user will switch from the current domain to the next domain. The service switch classifier may utilize a voter mechanism to combine the outputs from the plurality of classifiers to determine the prediction of whether the current user will switch from the current domain to the next domain. The voter mechanism may utilize a decision tree as a structure for evaluating and combining the outputs from the plurality of classifiers. In an embodiment, the prediction may correspond to a probability (a likelihood) that the current user will switch from the current domain to the next domain. If the prediction has a probability above a threshold (e.g., more than 50% of the plurality of classifiers predict that the current user will switch from the current domain to the next domain), then the current user is predicted to switch from the current domain to the next domain.

If the current user is predicted to switch from the current domain to the next domain (e.g., the prediction corresponds to a probability that the current user has an intent to switch to the next domain above a threshold), then the service switch classifier utilizes the current intent space vector and the intent space vectors, derived from the action sequence embeddings of the past user action sequences, to determine a next action to recommend to the current user. The next action may correspond to an action that can be performed within the next domain. For example, the next action may correspond to a recommendation to read coffee marker reviews of coffee makers available for purchase through the home appliance shopping website. In determining the next action, the service switch classifier may identify a threshold number of nearest intent space vectors (K nearest intent space vectors) in relation to the current intent space vector. The threshold number of nearest intent space vectors are determined because users with similar intents will behave similarly (e.g., users with an intent to learn more about coffee makers may read coffee maker reviews and/or purchase coffee makers). A current intent of the current user (e.g., an intent to learn more about coffee markers) may be determined based upon user action sequences of the threshold number of nearest intent space vectors (e.g., past actions performed by other users that had similar intent to learn about coffee makers). Actions, of the user action sequences of the threshold number of nearest intent space vectors, may be recommended to the user. For example, a link to coffee maker reviews within the home appliance shopping website may be provided to the user (e.g., the link may be emailed to the user, sent as a text message to the user, displayed to the user through the news mobile application, etc.).

Figure 7:
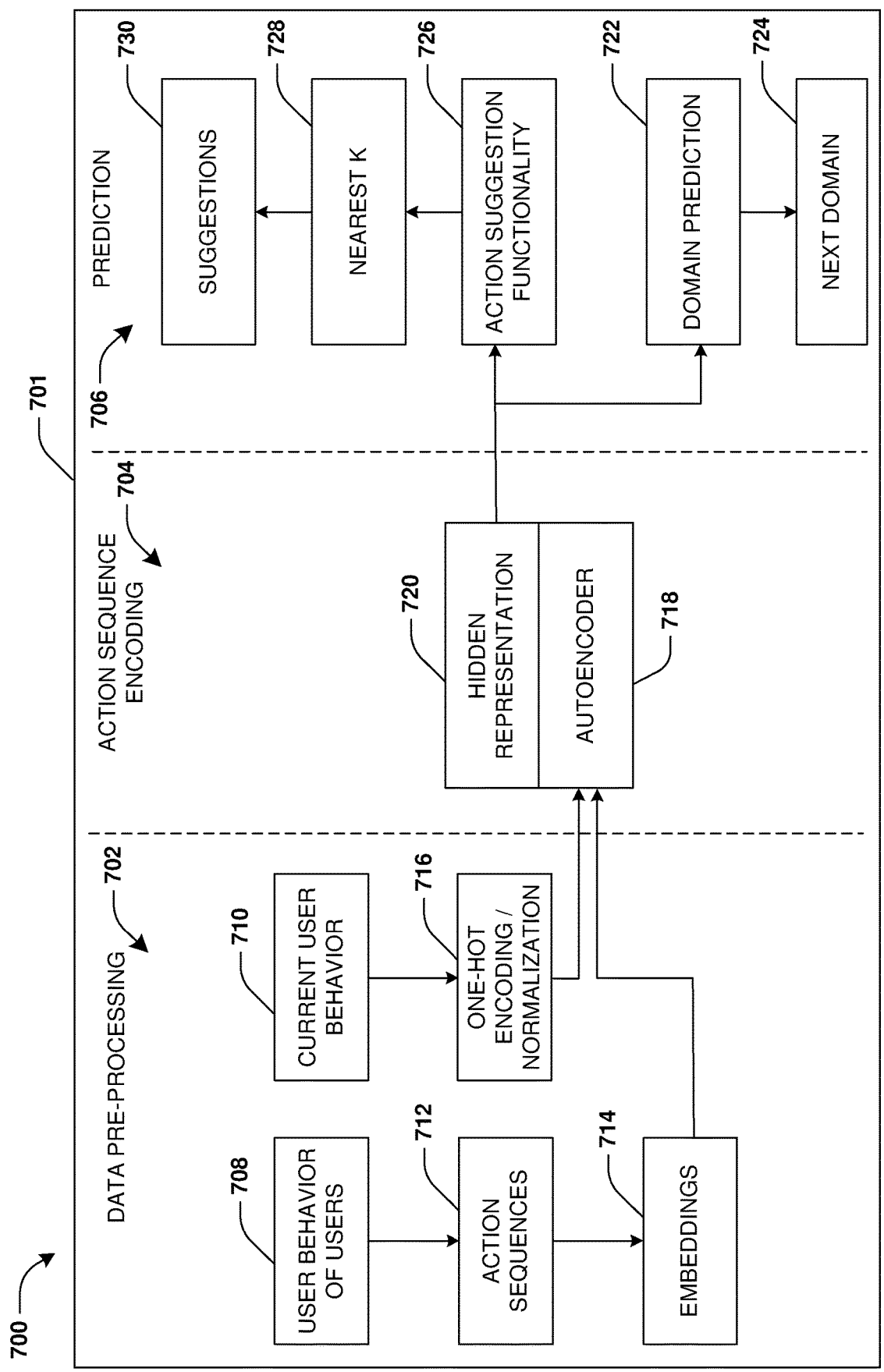
FIG. 7 is a component block diagram illustrating an example system for cross-domain action prediction.

FIG. 7 illustrates an example system 700 comprising a service switch classifier 701 configured for cross-domain action prediction. The service switch classifier 701 may be implemented as software, hardware, or a combination thereof (e.g., a service executing on one or more servers). The service switch classifier 701 may be invoked to perform cross-domain action prediction in response to a current user accessing a domain (e.g., the current user executing an application on a mobile device, accessing a website, accessing a service, etc.). During a data pre-processing phase 702, the service switch classifier 701 may track and identify current user behavior 710 of the current user. The current user behavior 710 may correspond to actions performed by the current user (e.g., recent actions performed within a threshold amount of time from a current time, consecutive actions performed within a threshold amount of time from one another, etc.). The service switch classifier 701 may apply 716 one-hot encoding (e.g., natural language processing to distinguish between words of content items upon which the actions were performed by the current user) and/or normalization to the current user behavior 710, which may be output as a current action sequence embedding for the current user (e.g., a normalized one-hot encoded vector generated after one-hot encoding and/or normalization).

The service switch classifier 701 may access past user behaviors 708 of users performing actions across various domains (e.g., users submitting search queries, viewing movies, submitting social network posts, reading blogs, purchasing services or items, etc.). The service switch classifier 701 may generate past user action sequences 712 based upon the past user behaviors 708. A past user action sequence may comprise consecutive actions performed by a user within a threshold amount of time from one another. A graph embedding and/or a textual embedding may be applied by the service switch classifier 701 to the past user action sequences 712 to generate action sequence embeddings 714.

The current user behavior 710 (e.g., the current action sequence embedding) and the action sequence embeddings 714 are input into an autoencoder 718 by the service switch classifier 701 during an action sequence embedding phase 704. The autoencoder 718 may utilize long short-term memory (LSTM) cells to learn representations of given action sequences and conglomerate action sequences having similar patterns. During each training iteration, the action sequence embeddings 714 and/or the current user behavior 710 (e.g., the current action sequence embedding) are input into the long short-term memory cells that will recursively update a hidden state. Hidden states of the autoencoder 718 are concatenated together as hidden representations 720 of each action sequence, which are projected into vector space as intent space vectors derived from the action sequence embeddings 714 and a current intent space vector derived from the current user behavior 710 of the current user (e.g., the current action sequence embedding). Because users with similar intentions are assumed to demonstrate similar patterns, intent space vectors from the hidden representations 720 can be utilized to make recommendations by conducting nearest-neighbor lookups 728 in the vector space during a prediction phase 706.

In an example, the intent space vectors may be utilized during the prediction phase 706 to perform a domain prediction 722 to identify a next domain 724 to which the user is predicted to switch. In another example, the intent space vectors may be processed using the nearest-neighbor lookups 728 during the prediction phase 706 using action suggestion functionality 726 of the service switch classifier to identify suggestions 730 of actions and/or content items to recommend to the current user. The suggestions 730 may correspond to actions and/or content items associated with the next domain 724.

Figure 8:
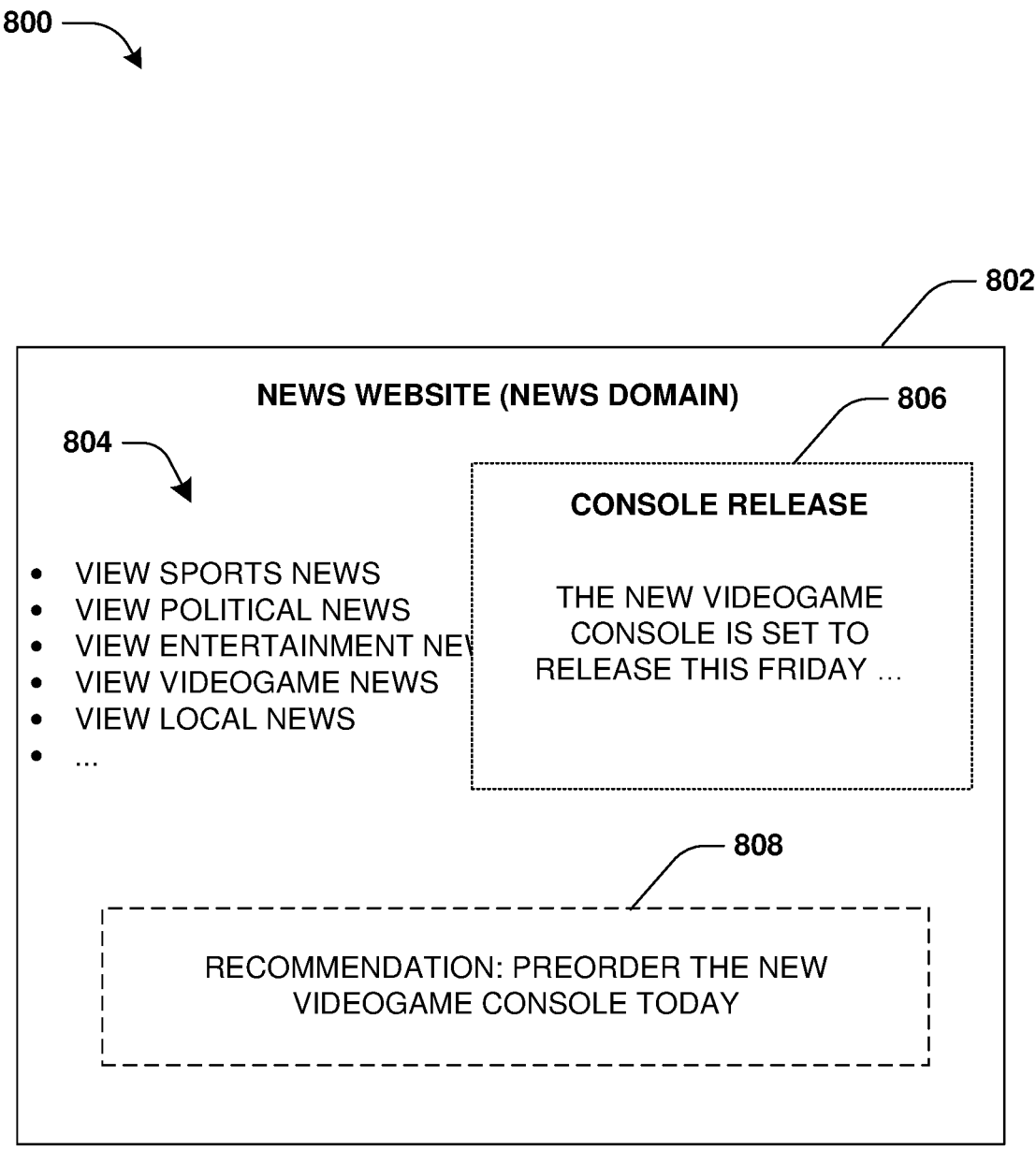
FIG. 8 is an illustration of an example of providing a recommendation based upon cross-domain action prediction.

FIG. 8 illustrates an example 800 of cross-domain prediction. A current user may utilize a computing device 802 to access a news website 804 associated with a news domain. A service switch classifier may track actions by the current user as a current user action sequence. For example, the current user may read an article 806 relating to a new videogame console that is to be released, along with performing other actions such as watching a video describing the new videogame console and reading social network posts about the new videogame console. The service switch classifier may utilize the current user action sequence and past user action sequences to predict that the current user will switch to a videogame shopping domain. The service switch classifier may utilize the current user action sequence and past user action sequences to generate a recommendation 808 to perform a preorder action through the videogame shopping domain to preorder the new videogame console. The recommendation 808 may be displayed on the computing device 802.

Figure 9:
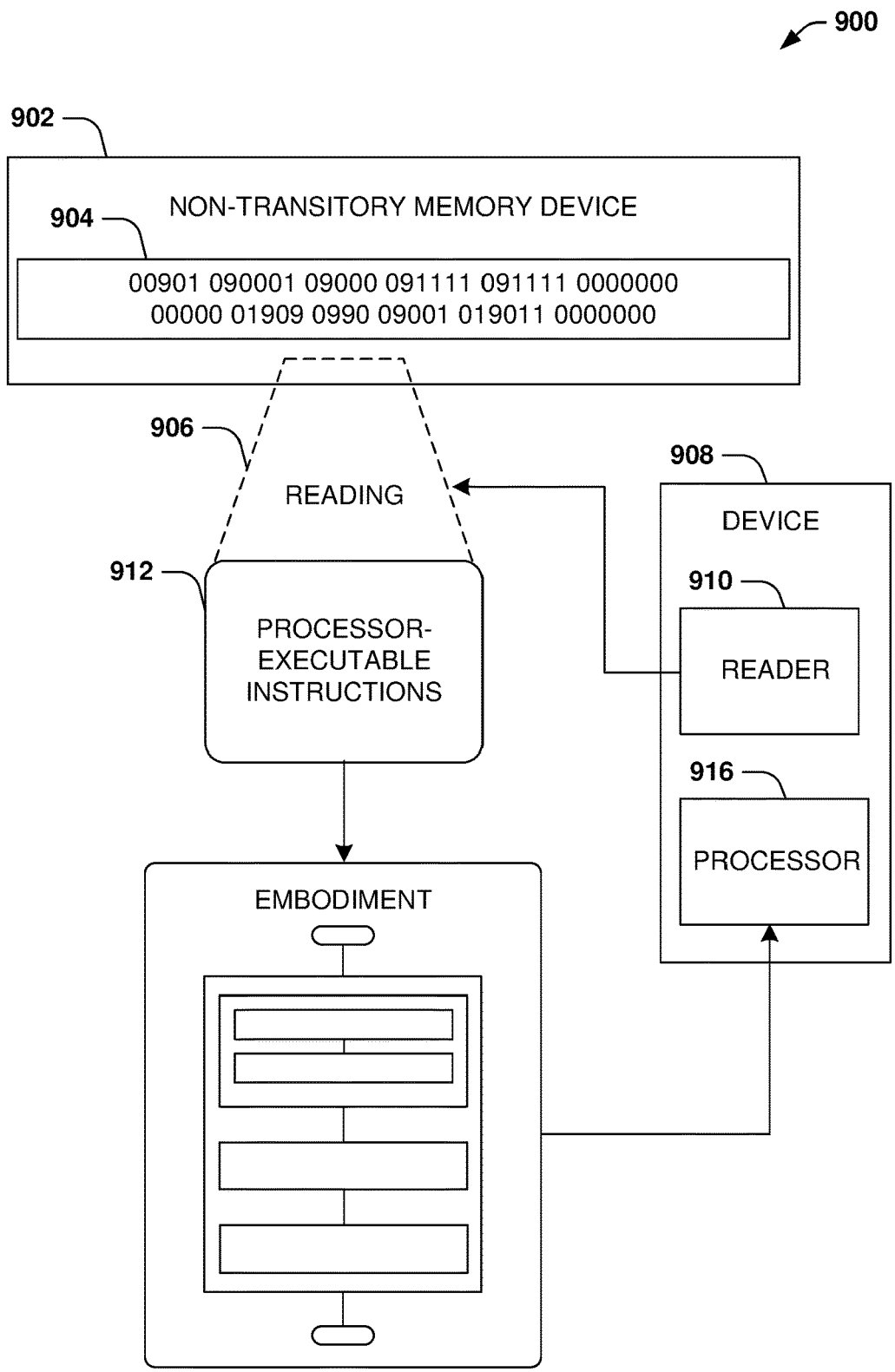
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 400 of FIG. 4, for example. In some embodiments, the processor-executable instructions 912 are configured to cause implementation of a system, such as at least some of the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
generating action sequence embeddings based upon a textual embedding applied to past user action sequences and based upon a graph embedding;
training an autoencoder utilizing the action sequence embeddings to project the action sequence embeddings to obtain intent space vectors, wherein a first intent space vector corresponds to a projection of a first action sequence embedding; and
predicting whether users will switch between domains based upon the intent space vectors.

2. The method of claim 1, wherein the predicting comprises:
applying the action sequence embeddings to a current user action sequence of a current user to generate a current action sequence embedding for predicting whether the current user will switch from a current domain to a next domain.

3. The method of claim 2, comprising:
projecting the current action sequence embedding to obtain a current intent space vector.

4. The method of claim 3, comprising:
generating a prediction of whether the current user will switch from the current domain to the next domain based upon the current intent space vector.

5. The method of claim 3, comprising:
utilizing the current intent space vector as input into a plurality of classifiers for determining a prediction of whether the current user will switch from the current domain to the next domain.

6. The method of claim 5, comprising:
utilizing a voter mechanism to combine outputs from the plurality of classifiers to determine the prediction of whether the current user will switch from the current domain to the next domain.

7. The method of claim 6, wherein a decision tree is utilized as a structure for performing the voter mechanism.

8. The method of claim 4, comprising:
in response to the prediction corresponding to a probability of the current user switching to the next domain above a threshold, utilizing the current intent space vector and the intent space vectors to determine a next action to recommend to the current user.

9. The method of claim 8, wherein the next action corresponds to an action that can be performed within the next domain.

10. The method of claim 8, comprising:
identifying a threshold number of nearest intent space vectors in relation to the current intent space vector.

11. The method of claim 10, comprising:
determining that a current intent of the current user corresponds to user action sequences of the threshold number of nearest intent space vectors.

12. The method of claim 11, comprising:
recommending actions, of the user action sequences of the threshold number of nearest intent space vectors, to the current user.

13. A computing device comprising:
a processor; and
memory comprising processor-executable instructions that when executed by the processor cause performance of operations, the operations comprising:
generating action sequence embeddings based upon a textual embedding and a graph embedding;
training an autoencoder utilizing the action sequence embeddings to project the action sequence embeddings to obtain intent space vectors, wherein a first intent space vector corresponds to a projection of a first action sequence embedding; and
predicting whether users will switch between domains based upon the intent space vectors.

14. The computing device of claim 13, comprising:
applying the action sequence embeddings to a current user action sequence of a current user to generate a current action sequence embedding; and
utilizing the current action sequence embedding to determine a prediction as to whether the current user will switch from a current domain to a next domain.

15. The computing device of claim 14, comprising:
in response to the prediction corresponding to a probability of the current user switching to the next domain above a threshold, utilizing a current intent space vector, derived from the current action sequence embedding, and the intent space vectors to determine a next action to recommend to the current user.

16. The computing device of claim 13, comprising:
training the autoencoder based upon time spent metrics, wherein a time spent metric corresponds to a time difference between two consecutive actions within past user action sequences.

17. The computing device of claim 13, comprising:
training the autoencoder based upon times at which actions within past user action sequences were performed.

18. The computing device of claim 13, comprising:
training the autoencoder based upon content sizes of content items upon which actions within past user action sequences were performed.

19. The computing device of claim 13, comprising:
training the autoencoder based upon content types of content items upon which actions within past user action sequences were performed.

20. A non-transitory machine readable medium having stored thereon processor-executable instructions that when executed cause performance of operations, the operations comprising:
- generating action sequence embeddings based upon a textual embedding and a graph embedding;
- training an autoencoder utilizing the action sequence embeddings to project the action sequence embeddings to obtain intent space vectors, wherein a first intent space vector corresponds to a projection of a first action sequence embedding; and
- predicting that a current user will switch from a current domain to a next domain based upon the intent space vectors.

* * * * *